United States Patent
Konishi et al.

(10) Patent No.: US 7,400,909 B2
(45) Date of Patent: Jul. 15, 2008

(54) MOBILE COMMUNICATION APPARATUS USED TO COMMUNICATE INFORMATION BETWEEN MOBILE UNITS

(75) Inventors: Yoshichika Konishi, Obu (JP); Eiji Niwa, Nagoya (JP)

(73) Assignee: Aisin Seiki Kabushiki Kaisha, Aichi (JP)

( * ) Notice: Subject to any disclaimer, the term of this patent is extended or adjusted under 35 U.S.C. 154(b) by 0 days.

(21) Appl. No.: 10/566,398

(22) PCT Filed: Jul. 21, 2004

(86) PCT No.: PCT/JP2004/010324

§ 371 (c)(1),
(2), (4) Date: Jan. 30, 2006

(87) PCT Pub. No.: WO2005/013511

PCT Pub. Date: Feb. 10, 2005

(65) Prior Publication Data

US 2006/0194543 A1 Aug. 31, 2006

(30) Foreign Application Priority Data

Jul. 30, 2003 (JP) ............................. 2003-282995

(51) Int. Cl.
*H04M 1/00* (2006.01)
(52) U.S. Cl. .............. 455/569.2; 455/67.13; 455/67.11; 455/63.1; 455/3.03; 455/99; 455/152.1; 455/238.1; 455/505; 455/515; 455/550.1; 375/132; 375/138
(58) Field of Classification Search ............... 455/63.1, 455/67.13, 3.03, 569.2, 550.1, 238.1, 152.1, 455/69, 99, 515, 67.11, 505, 65; 375/130, 375/132, 138; 340/3.41, 455; 701/2, 301, 701/213, 302
See application file for complete search history.

(56) References Cited

U.S. PATENT DOCUMENTS

| | | | | |
|---|---|---|---|---|
| 5,335,249 A | * | 8/1994 | Krueger et al. | 375/149 |
| 5,926,762 A | * | 7/1999 | Arpee et al. | 455/447 |
| 5,946,603 A | * | 8/1999 | Ibanez-Meier et al. | 455/13.1 |
| 6,424,643 B1 | * | 7/2002 | Gutowski | 370/342 |
| 6,429,812 B1 | * | 8/2002 | Hoffberg | 342/357.1 |
| 6,665,521 B1 | * | 12/2003 | Gorday et al. | 455/67.11 |

(Continued)

FOREIGN PATENT DOCUMENTS

JP 11-177530 7/1999

(Continued)

*Primary Examiner*—Matthew Anderson
*Assistant Examiner*—Shaima Q Aminzay
(74) *Attorney, Agent, or Firm*—Sughrue Mion, PLLC (57) ABSTRACT

A mobile communication apparatus is provided, which permits highly efficient communication even between mobile units that cannot communicate directly because of signal-shielding communication obstacles.

The mobile communication apparatus 10 includes transmission means 11, reception means 11, surrounding environment detection means 13, 14 for detecting whether or not there are communication obstacles in the surroundings of a mobile unit, communication state decision means 15 for making decisions as to the quality of the communication state of the mobile unit based on detection results of the surrounding environment detection means 13, 14, and control means 16 for controlling transmission, via the transmission means 11, of information received by the reception means 11 based on decision results of the communication state decision means 15.

6 Claims, 4 Drawing Sheets

U.S. PATENT DOCUMENTS

| | | | |
|---|---|---|---|
| 6,813,561 B2 * | 11/2004 | MacNeille et al. | 701/213 |
| 7,027,773 B1 * | 4/2006 | McMillin | 455/41.2 |
| RE39,427 E * | 12/2006 | O'Sullivan | 455/557 |
| 2002/0042272 A1 * | 4/2002 | Wedi et al. | 455/442 |
| 2005/0208896 A1 * | 9/2005 | Lafleur et al. | 455/63.1 |

FOREIGN PATENT DOCUMENTS

| | | |
|---|---|---|
| JP | 2000-513912 A | 10/2000 |
| JP | 2001-237764 | 8/2001 |
| JP | 2001-283381 | 10/2001 |
| JP | 2003-067727 | 3/2003 |
| JP | 2003-152631 | 5/2003 |
| JP | 2003-282995 | 11/2005 |
| WO | WO 02/28134 | 4/2002 |

* cited by examiner

MOBILE COMMUNICATION APPARATUS USED TO COMMUNICATE INFORMATION BETWEEN MOBILE UNITS

BACKGROUND OF THE INVENTION

1. Field of the Invention

The present invention relates to a communication apparatus used to communicate movement-related information between mobile units such as vehicles.

2. Description of Related Art

For instance, one such conventional apparatus used for sending and receiving signals between mobile units such as vehicles is described in Patent Document 1. With this apparatus, when a vehicle detects information regarding traffic flow and emergencies, etc., the vehicle can transmit the information to all vehicles within range of possible wireless transmission.

However, high-frequency signals are normally used for wireless communication in car-to-car communication systems. Consequently, the problem is that when there are communication obstacles, such as, for instance, buildings, etc., that shield high-frequency signals, communication with cars in their shadow is rendered impossible.

On the other hand, a well-known mobile communication technology, called multi-hop wireless network technology, permits communication between mobile units that cannot communicate with one another directly by relaying signals via a plurality of mobile units. In addition, routing protocols have been developed for building routes in various multi-hop wireless networks. In other words, communication between mobile units and a mobile unit to which signals cannot be sent directly is made possible by relaying signals via other mobile units (e.g., see Patent Document 2).

Patent Document 1: JP 2001-283381A (paragraph 0077 through Paragraph 0079, see FIG. 9).

Patent Document 2: JP 2001-237764A (pages 3 through 7, see FIG. 1, FIG. 4, and FIG. 6).

However, due to the fact that hopping in multi-hop wireless networks of mobile units happens in a disorderly fashion, the problem is that route convergence requires more time, which degrades communication efficiency.

SUMMARY OF THE IMVENTION

The present invention was made with account taken of the problems mentioned above, and it is an object of the invention to provide a mobile communication apparatus permitting highly efficient communication between mobile units that cannot communicate directly because of signal-shielding communication obstacles.

Features of the inventive mobile communication apparatus intended to address the problems consist in including reception means, transmission means, surrounding environment detection means for detecting whether or not there are communication obstacles in the surroundings of a mobile unit, communication state decision means for making decisions as to the quality of the communication state of the mobile unit based on detection results of the surrounding environment detection means, and control means for controlling transmission by the transmission means of information received by the reception means based on decision results of the communication state decision means.

According to these features, the mobile communication apparatus makes decisions as to the quality of the communication state of a mobile unit depending on whether or not there are communication obstacles in the surroundings of the mobile unit. In addition, it controls transmission, by the transmission means, of information received by the reception means, that is, information hopping, depending on the quality of the communication state of the mobile unit. Therefore, it permits control in such a manner that the burden of information hopping is preferentially placed on a mobile communication apparatus in a satisfactory communication state having no communication obstacles in the surroundings of the mobile unit. Carrying out control in this manner permits more efficient communication as compared with the case wherein all mobile units perform hopping in a disorderly fashion. Namely, this method permits highly efficient communication between mobile units that cannot communicate directly because of signal-shielding communication obstacles.

In addition, preferably, when the surrounding environment detection means detects no communication obstacles in the surroundings of a mobile unit, the communication state decision means decides that the mobile unit is in a satisfactory communication state, and, at the same time, the control means transmits, via the transmission means, information received by the reception means; and, when the surrounding environment detection means detects communication obstacles in the surroundings of a mobile unit, the communication state decision means decides that the mobile unit is in an unsatisfactory communication state and, at the same time, the control means transmits, via the transmission means, the information received by the reception means only if no information identical to the information is received again within a predetermined period of time after its receipt.

In this manner, if the communication state decision means decides that the mobile unit is in a satisfactory communication state, the control means carries out transmission of the received information via the transmission means, i.e. information hopping. Additionally, if the communication state decision means decides that the mobile unit is in an unsatisfactory communication state, the control means waits for the predetermined time period to elapse before hopping, and performs hopping only if the same information is not received again during that time. Namely, when the mobile unit in an unsatisfactory communication state receives certain information and then receives the same information during the predetermined time period, it decides that during that time period hopping is performed by other mobile units (mobile units in a satisfactory communication state) and does not perform hopping itself. Therefore, comparison between mobile units in an unsatisfactory communication state and mobile units in a satisfactory communication state shows that the burden of hopping is preferentially placed on the mobile units in a satisfactory communication state. As a result, more efficient communication is made possible in comparison with the case wherein all mobile units perform hopping in a disorderly fashion.

Furthermore, the surrounding environment detection means preferably includes imaging means installed in the mobile unit. It becomes possible to detect the presence of communication obstacles, using a simple configuration, by the surrounding environment detection means acquiring images of the surroundings of the mobile unit with the help of the imaging means. Moreover, the reception means and the transmission means are preferably a wireless communication device.

DETAILED DESCRIPTION OF THE INVENTION

Figure 1:
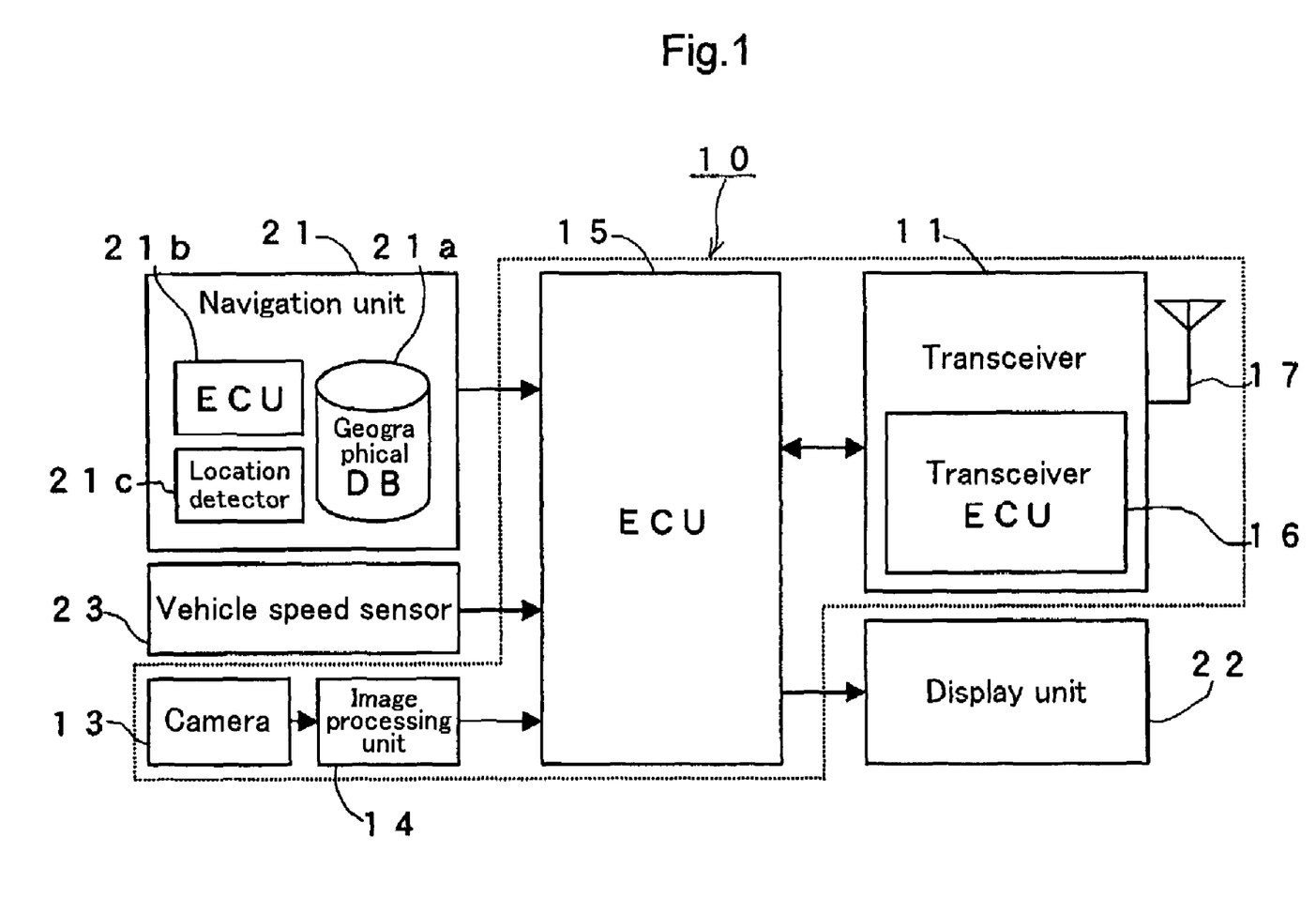
FIG. 1 is a block diagram illustrating the configuration of the mobile communication apparatus of the present invention.

The best mode (hereinafter referred to as embodiments as appropriate) of carrying out the present invention is explained hereinbelow by referring to drawings. FIG. 1 is a block diagram illustrating the configuration of the inventive mobile communication apparatus 10 (mobile communication apparatus). In this embodiment, the mobile communication apparatus 10 is installed in vehicles 51 through 57 (mobile units) illustrated in FIG. 2. However, mobile units equipped with the mobile communication apparatus 10 are not limited to vehicles.

As shown in FIG. 1, the mobile communication apparatus 10 is equipped with a wireless transceiver 11 (a transceiver 11; reception means, transmission means, wireless communication device), a wireless ECU 16 (a transceiver ECU 16; control means), a camera 13 (surrounding environment detection means, imaging means), an image processing unit 14 (surrounding environment detection means), and an ECU 15 (communication state decision means). Moreover, a navigation unit 21 and a display unit 22 are connected to the ECU 15 of the mobile communication apparatus 10.

The transceiver 11 carries out wireless communication (sending and receiving) of information via an antenna 17 to and from other vehicles located within the range in which signals can be transmitted with wireless communication output values predetermined for the vehicle's position.

The information received by the transceiver 11 is processed by the transceiver ECU 16 and outputted to the ECU 15, if necessary. Moreover, the transceiver ECU 16 transmits various types of information from the transceiver 11. Namely, the transceiver ECU 16 transmits information directly from the transceiver 11 to all other vehicles within range of possible wireless communication. One type of information transmitted by the transceiver ECU 16 is vehicle information, which describes the location and running conditions of a vehicle.

Specifically, information describing vehicle position includes the heading of the vehicle and the current location of the vehicle (car location (latitude and longitude)) detected by the navigation unit 21. Moreover, information describing the running conditions of the vehicle includes the speed of the vehicle, which is detected by a vehicle speed sensor 23.

The transceiver ECU 16 then acquires and puts together information on the car's location, heading, and speed via the ECU 15 and transmits it at predetermined intervals as vehicle information, with the vehicle ID of the vehicle and a data serial number attached thereto. In addition, a data transfer number is automatically assigned to the vehicle information data. As far as the data transfer number is concerned, n (for instance, an integer such as 4, 5, etc.) is assigned to data used initially for transmitting the vehicle information of the vehicle, and an (n−1)th number is assigned to data transferred from the vehicle that receives this vehicle information. Namely, whenever forwarding takes place, the assigned data transfer number is decremented by one. In addition, when the data transfer number of the received information is larger than 0, the transceiver ECU 16 relays and transfers the information (i.e. performs hopping).

In addition, when vehicle information is received from other vehicles, the transceiver ECU 16 carries out control as to whether or not to transmit the vehicle information of other vehicles (hopping) depending on the decision results obtained by the ECU 15 based on images acquired by the camera 13. The processing is described in detail below.

The camera 13 is installed, for instance, in the vicinity of the front end of the vehicle and can acquire images of the terrain in front of the vehicle, as well as images of the terrain to the right and left of it at prescribed angles. In addition, the camera 13 outputs a video signal containing acquired images to the image processing unit 14.

Based on the image signal inputted from the camera 13, the image processing apparatus 14 detects whether or not there are any communication obstacles shielding wireless signals, such as buildings and walls, especially to the right and left of the vehicle. The detection method is involved in obtaining the complexity of the ambient environment based on the distribution of luminance variations contained in the image signal. Namely, the image processing apparatus 14 segments the acquired image, setting up a plurality of blocks. Next, the operation of segmenting the blocks and setting up new blocks is repeated until it is decided that the luminance values of the pixels are uniform in each of the blocks that have been set up. The complexity of the environment is then computed based on the number of blocks at which the luminance values of the pixels become uniform. If the results of this computation indicate that the complexity is larger than a prescribed predetermined value, the presence of communication obstacles is detected in the surroundings of the vehicle. The detection results are then outputted to the ECU 15.

It should be noted that detailed explanations related to the detection method are omitted here because the method is described in Japanese Patent Application "kokai" No.:2003-067727. It should be noted that techniques used to obtain the complexity of the ambient environment are not limited to the above-described luminance-based technique, and may be based on brightness, color difference, hue, chroma, density, etc. contained in the image signal. As explained above, in the present invention, the presence of communication obstacles can be detected using a simple configuration, i.e. the camera 13 and the image processing unit 14.

The ECU 15 is constituted by a digital computer provided with logical circuits such as a CPU (central processing unit) and memories, such as a RAM (random-access memory) and a ROM (read-only memory). The ECU 15 makes decisions as to the quality of the communication state of the vehicle based on the detection results obtained by the image processing unit 14 (detection results indicating whether or not there are communication obstacles in the surroundings of the vehicle). The processing is described in detail below.

In addition, as mentioned above, the ECU 15 outputs the information on the location of the vehicle obtained from the navigation unit 21, as well as the speed of the vehicle obtained from the vehicle speed sensor 23, to the transceiver ECU 16.

Moreover, the ECU 15 displays the surrounding environment of the vehicle on the display unit 22 based on the vehicle information of other vehicles inputted from the transceiver ECU 16. An example of the display will also be described below. Furthermore, the ECU 15 displays images acquired by the camera 13 on the display unit 22. It should be noted that the functions of the ECU 15 are not limited to the ones described above.

The navigation unit 21 is provided with a navigation ECU 21b, a current location detector 21c, and a geographical database 21a. The current location detector 21c receives radio waves from two or more GPS satellites and detects the current location of the vehicle. The navigation ECU 21b acquires the current location established by the current location detector 21c and uses it to detect the heading of the vehicle. It then outputs the detection results to the ECU 15.

The vehicle speed sensor 23 is installed, for instance, in the vicinity of the rear wheel shaft of the vehicle. The vehicle speed sensor 23 detects the pulses of the transmission and computes the speed of the vehicle. It then outputs the results of computation to the ECU 15.

The display unit 22 is a display arranged in the vicinity of the instrument panel inside the vehicle. Although the display unit 22 normally functions as a display for the navigation unit 21, the ECU 15 switches it between different screens, i.e. a screen used for the navigation unit 21, as well as other screens, for instance, screens showing the surrounding environment of the vehicle based on the vehicle information of other vehicles, screens showing images acquired by the camera 13, etc.

Figure 3:
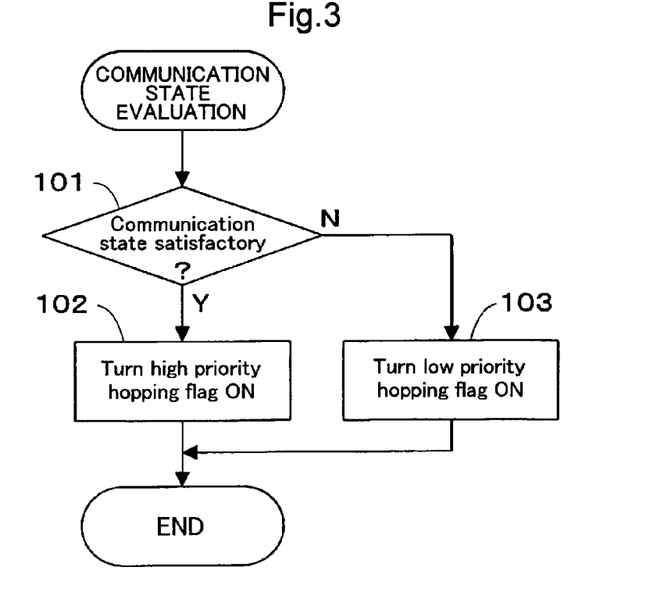
FIG. 3 is a flow chart illustrating an embodiment of control implemented in the mobile communication apparatus of the present invention.

Here, explanations will be provided regarding processing involved in decisions concerning the quality of the communication state of the vehicle, which the ECU 15 makes with reference to FIG. 3. The processing is executed repeatedly based on regular interrupts generated at predetermined intervals.

When the processing shifts to this routine, in step 101, the ECU 15 makes a decision as to the quality of the communication state of the vehicle. The decision is based on the detection results of the image processing unit 14 described above. Namely, when the image processing unit 14 detects no communication obstacles in the surroundings of the vehicle, the ECU 15 decides that the vehicle is in a satisfactory communication state and proceeds to Step 102, and when the image processing apparatus 14 detects communication obstacles in the surroundings of the vehicle, the ECU 15 decides that the vehicle is in an unsatisfactory communication state and proceeds to step 103.

In Step 102, the ECU 15 sets a high priority hopping flag. In step 103, the ECU 15 sets a low priority hopping flag. The processing is then terminated.

Figure 2:
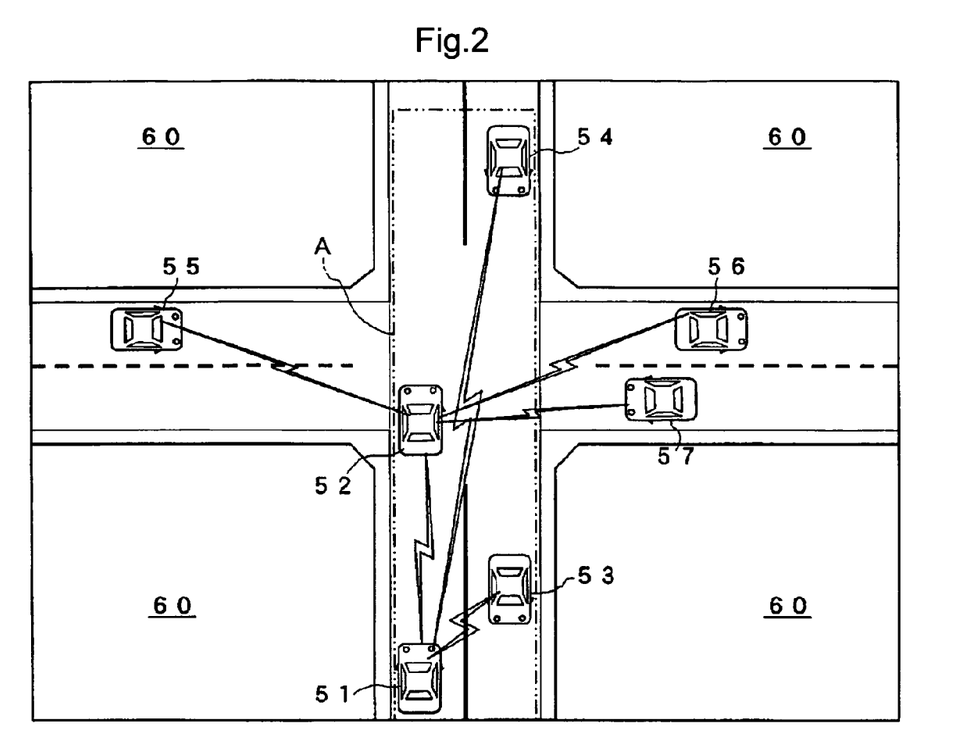
FIG. 2 is a diagram illustrating a vehicle equipped with the mobile communication apparatus of the present invention.

The processing above will be now explained with reference to vehicles 51 through 57 illustrated in FIG. 2. Among the vehicles 51 through 57, vehicle 52 is located at an intersection and the surroundings (especially, on the right and left) of the vehicle 52 contain no communication obstacles that would shield wireless signals, such as buildings 60, etc. Therefore, in the vehicle 52, the ECU 15 decides that the vehicle is in a satisfactory communication state and sets a high priority hopping flag. Because the surroundings of the vehicles other than 52, such as vehicles 51 and 53 through 57, contain buildings 60, which act as communication obstacles, each one of them assumes that it is in an unsatisfactory communication state and sets a low priority hopping flag.

Figure 4:
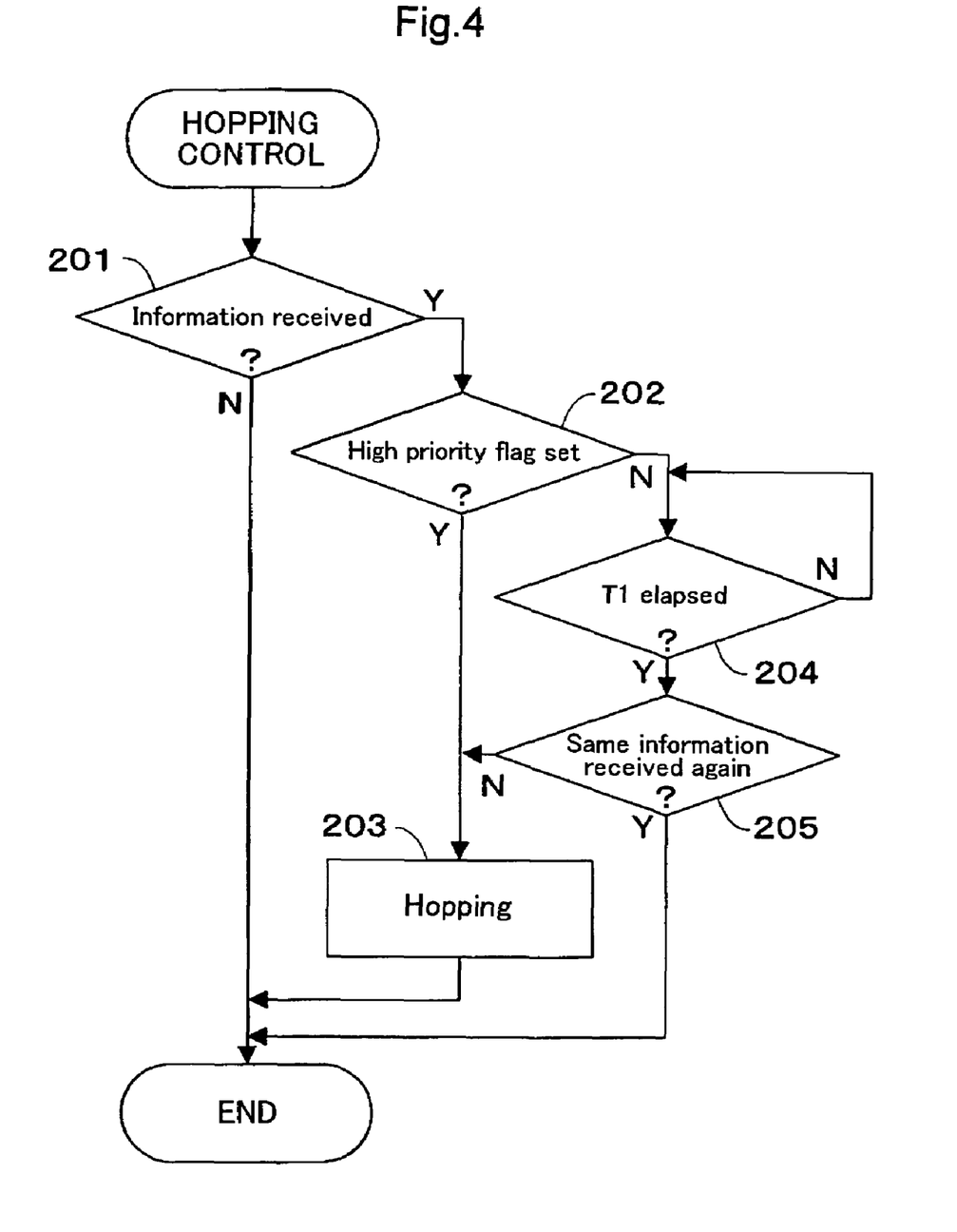
FIG. 4 is a flow chart illustrating an embodiment of control implemented in the mobile communication apparatus of the present invention.

Next, processing executed by the transceiver ECU 16 in order to control whether or not to transmit vehicle information of other vehicles (whether to perform hopping) when vehicle information is received from the other vehicles is explained with reference to FIG. 4. This type of processing is also executed repeatedly based on regular interrupts at predetermined intervals. Moreover, it may be executed in response to an interrupt upon receipt of vehicle information from another vehicle.

When the processing shifts to this routine, in step 201, the transceiver ECU 16 decides whether or not vehicle information has been received from other vehicles. If it has been received, the unit proceeds to step 202. The processing is terminated if it has not been received.

In step 202, the transceiver ECU 16 decides whether or not a high priority hopping flag has been set by the ECU 15. It proceeds to step 203 and performs hopping if it decides that a high priority hopping flag has been set. Namely, the transceiver ECU 16 transmits vehicle information of other vehicles received by the transceiver 11 serving as the reception means through the transceiver 11 serving as the transmission means. The transmission is performed without delay.

If the transceiver ECU 16 decides in step 202 that a low priority hopping flag has been set, it proceeds to step 204.

In step 204, the transceiver ECU 16 decides whether or not a predetermined time period T1 has elapsed since receipt of the vehicle information from other vehicles. If it has not elapsed, it returns to step 204, and if it has elapsed, it proceeds to step 205.

In step 205, the transceiver ECU 16 decides whether or not vehicle information identical to the already received vehicle information of other vehicles has been received again during the predetermined time period T1. Whether the vehicle information is identical or not is decided by matching the vehicle ID and the data serial number, which are contained, as mentioned above, in each piece of vehicle information data. When it is decided in step 205 that the transceiver ECU 16 has received it again, the processing is terminated. If the transceiver ECU 16 decides that it has not been received again, it proceeds to Step 203 and performs hopping. As explained in Step 202 through Step 205 above, when the transceiver ECU 16 decides that a low priority hopping flag has been set, it transmits the vehicle information of the other vehicles received by the transceiver 11 serving as the reception means through the transceiver 11 serving as the transmission means only if the same information has not been received again during the predetermined time period T1 after its receipt.

The processing above will be now explained with reference to vehicles 51 through 57 illustrated in FIG. 2. Here, let us consider a case where the transceiver ECU 16 of the vehicle 51 (hereinafter referred to as the transceiver ECU 16 (1)) first transmits its own vehicle information. Here, the transceiver ECU 16 (1) transmits the vehicle information directly from the transceiver 11 to all other vehicles 52, 53, and 54 located within range of possible wireless communication (range A, shown with an alternating two-dot chain line in FIG. 2). It should be noted that since the vehicles 55, 56, and 57 are in the shadow of buildings 60 from the viewpoint of the vehicle 51, the signal from the vehicle 51 does not reach them.

Here, the transceiver ECU 16 of the vehicle 52 decides that a high priority hopping flag has been set in Step 202, as described above, and performs vehicle information hopping for the vehicle 51. As a result, the vehicle signal from the vehicle 51 can be transmitted to the vehicles 55, 56, and 57. It should be noted that in this case the vehicle information of the vehicle 51, for which hopping is done by the vehicle 52, is also transmitted to the vehicles 53 and 54.

On the other hand, as described above, in Step 202 the transceiver ECU 16 of the vehicle 53 (hereinafter referred to as the transceiver ECU 16 (3)) decides that a low priority hopping flag has been set and proceeds to steps 204 and 205. Then, in Step 205, the transceiver ECU 16 (3) does not perform vehicle information hopping for the vehicle 51 and terminates processing because information identical to the vehicle information of the vehicle 51 has been received again from the vehicle 52 within the predetermined time period T1. It should be noted that what applies to the vehicle 53 applies also to the vehicle 54.

Figure 5:
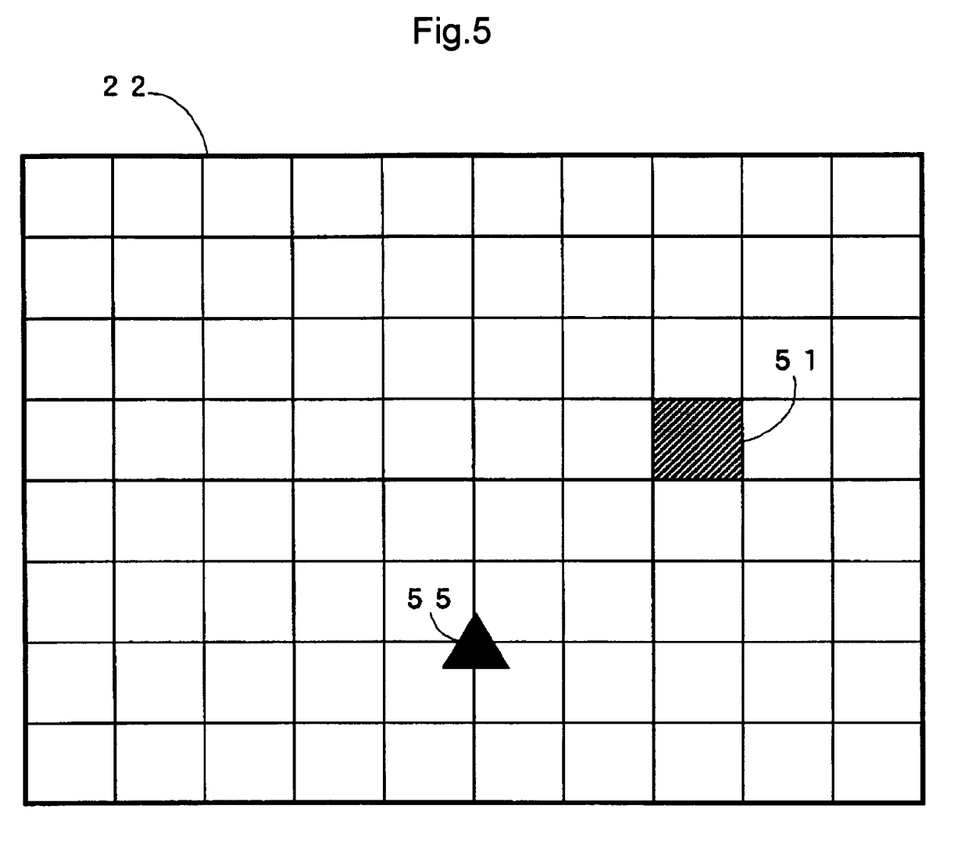
FIG. 5 is a diagram illustrating an example of a display shown on the display unit of a vehicle equipped with the mobile communication apparatus of the present invention.

Here, FIG. 5 shows an example of the image displayed on the display unit 22 by the ECU 15 when the vehicle information of the vehicle 51 is received, for instance, in case of the vehicle 55. It should be noted that in this embodiment, the information is not transmitted directly from vehicle 51, but reaches the vehicle 55 by hopping through the vehicle 52, as described above.

As illustrated in FIG. 5, symbols for the vehicle 55 and the other vehicle 51 are displayed on the display unit 22. As a result, the driver of the vehicle 55 can be aware of other vehicles approaching from the front right in the direction of its movement. In other words, even if information cannot be received directly because of communication obstacles, the vehicle 55 can be aware of the approach of another vehicle 51.

As explained above, the burden of information hopping is preferentially put on the mobile communication apparatus 10 installed in the vehicle 52, which is in a satisfactory communication state, free from communication obstacles, rather than on the mobile communication apparatuses 10 installed in the vehicles 53 and 54, which are in an unsatisfactory communication state, and, as a result, the mobile communication apparatus 10 of the present invention permits more efficient communication as compared with the case wherein the communication apparatuses of the vehicles perform hopping in a disorderly fashion. Namely, more efficient communication is made possible even between vehicles that cannot communicate directly because of the buildings 60 that shield the signal.

In this embodiment, the location, heading, and speed of the vehicle were included in the vehicle information, but it is not limited thereto. For instance, it may contain alarm information generated according to the driver's intent or information based on images acquired by the camera 13.

In this embodiment, the image processing unit 14 segmented the acquired image into a plurality of blocks according to the luminance value in order to compute the complexity of the image, and, based on this, to detect communication obstacles in the surroundings of the vehicle; however, methods used for detecting communication obstacles are not limited thereto. Furthermore, detection may be performed using a laser radar, infrared rays, a sonar, etc., without relying on the images of the camera 13.

In this embodiment, communication obstacles in the surroundings of the vehicle were detected by the image processing apparatus 14; however, it is also possible to use a configuration wherein detection is accomplished with the help of the ECU 15.

In this embodiment, the ECU 15 made decisions concerning the communication state of the vehicle and hopping control was carried out by the transceiver ECU 16; however, it is also possible to use a configuration, in which the corresponding processing is performed by the ECU 15 or by the transceiver ECU 16 alone.

In this embodiment, the transceiver 11 was equipped with both the reception means and the transmission means of the present invention; it is also possible, however, to use a configuration, in which the two means are independent.

The present invention is applicable to mobile communication methods and mobile communication apparatuses permitting highly efficient communication even in environments, in which direct communication is impossible because of signal-shielding communication obstacles during communication between mobile units, and to mobile units utilizing these methods and apparatuses. It should be noted that communication between mobile units includes, for instance, communication between cars, between mobile devices, between cars and mobile devices, and the invention is naturally applicable to such cases as well.

The following are reference numerals used in the drawings.
10 mobile communication apparatus (mobile communication apparatus)
11 transceiver (reception means, transmission means)
13 camera (surrounding environment detection means)
14 image processing unit (surrounding environment detection means)
15 ECU (communication state decision means)
16 transceiver ECU (control means)
51 vehicle (mobile unit)
52 vehicle (mobile unit)
53 vehicle (mobile unit)
54 vehicle (mobile unit)
55 vehicle (mobile unit)
56 vehicle (mobile unit)
57 vehicle (mobile unit)

The invention claimed is:

1. A mobile communication apparatus mounted on a subject mobile unit for effecting wireless communication between a plurality of mobile units including said subject mobile unit, another mobile unit, and a third mobile unit, the apparatus comprising:
   reception means for receiving information transmitted from said another mobile unit;
   transmission means for hopping the received information to the third mobile unit;
   surrounding environment detection means for detecting whether or not there are communication obstacles shielding wireless signals in the surrounding environment;
   communication state decision means for making decisions as to the communication state quality based on said detection results indicating whether or not there are communication obstacles shielding the wireless signals; and
   control means, which transmits received information via the transmission means when the surrounding environment detection means detects no communication obstacles and the surrounding environment detection means decides that the mobile unit is in a satisfactory communication state and then hops the received information from said transmission means to the third mobile unit.

2. The mobile communication apparatus according to claim 1, wherein, when the communication state decision means decides that the mobile unit is in an unsatisfactory communication state if the surrounding environment detection means detects the communication obstacles, the control means transmits the information received by the reception means via the transmission means only if no information identical to the received information is received again within a predetermined period of time after its receipt.

3. The mobile communication apparatus according to claim 1, wherein the surrounding environment detection means is an imaging means installed in the subject mobile unit.

4. The mobile communication apparatus according to claim 1, wherein the reception means and the transmission means is a wireless communication device.

5. A mobile communication apparatus mounted on a subject mobile unit for effecting wireless communication between a plurality of mobile units including said subject mobile unit, another mobile unit, and a third mobile unit, the apparatus comprising:
   reception means for receiving information transmitted from said another mobile unit;

transmission means for hopping the received information to the third mobile unit;

surrounding environment detection means for detecting whether or not there are communication obstacles shielding wireless signals in the surrounding environment;

communication state decision means for making decisions as to the communication state quality based on said detection results indicating whether or not there are the communication obstacles shielding the wireless signals; and control means, which transmits, via the transmission means, information received by the reception means if the communication state decision means decides that the mobile unit is in a satisfactory communication state and then hops the received information from said transmission means to the third mobile unit.

6. A mobile communication apparatus mounted on a subject mobile unit for effecting wireless communication between a plurality of mobile units including said subject mobile unit, another mobile unit, and a third mobile unit, the apparatus comprising:

reception means for receiving information transmitted from said another mobile unit;

transmission means for hopping the received information to the third mobile unit;

surrounding environment detection means for detecting whether or not there are communication obstacles shielding wireless signals in the surrounding environment;

communication state decision means for making decisions as to the communication state quality based on said detection results indicating whether or not there are communication obstacles shielding the wireless signals; and control means, which transmits, via the transmission means, the information received by the reception means and then hops the received information from said transmission means to the third mobile unit only if no information identical to that information is received again within a predetermined period of time after its receipt when the communication state decision means decides that the mobile unit is in an unsatisfactory communication state.

\* \* \* \* \*